United States Patent
Parulski et al.

(10) Patent No.: US 6,629,104 B1
(45) Date of Patent: Sep. 30, 2003

(54) METHOD FOR ADDING PERSONALIZED METADATA TO A COLLECTION OF DIGITAL IMAGES

(75) Inventors: Kenneth A. Parulski, Rochester, NY (US); John R. McCoy, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 91 days.

(21) Appl. No.: 09/721,222

(22) Filed: Nov. 22, 2000

(51) Int. Cl.[7] .............................................. G06F 17/30
(52) U.S. Cl. ........................ 707/102; 396/2; 348/231.2
(58) Field of Search ............................. 707/104, 102, 707/7; 709/201; 705/10; 355/40; 396/2; 348/231.2, 231.3, 307 R, 323, 322

(56) References Cited

U.S. PATENT DOCUMENTS

| | | | |
|---|---|---|---|
| 5,164,831 A | | 11/1992 | Kuchta et al. |
| 5,477,264 A | | 12/1995 | Sarbadhikari et al. |
| 5,734,425 A | | 3/1998 | Takizawa et al. |
| 5,901,245 A | * | 5/1999 | Warnick et al. ............. 382/190 |
| 5,940,121 A | * | 8/1999 | Mcintyre et al. ............. 348/64 |
| 6,072,980 A | * | 6/2000 | Manico et al. ............. 434/317 |
| 6,115,717 A | * | 9/2000 | Mehrotra et al. ........... 707/102 |
| 6,180,312 B1 | * | 1/2001 | Edwards ...................... 430/140 |
| 6,223,183 B1 | * | 4/2001 | Smith et al. ................. 707/102 |
| 6,360,234 B2 | * | 3/2002 | Jain et al. ................. 715/500.1 |
| 6,389,181 B2 | * | 5/2002 | Shaffer et al. ............. 382/305 |
| 6,408,301 B1 | * | 6/2002 | Patton et al. ............... 707/102 |
| 6,411,724 B1 | * | 6/2002 | Vaithilingam et al. ...... 382/100 |
| 6,490,370 B1 | * | 12/2002 | Krasinski et al. ........... 382/195 |
| 6,526,158 B1 | * | 2/2003 | Goldberg ..................... 382/115 |

OTHER PUBLICATIONS

"Fotofile: A Consumer Multimedia Organization and Retrieval System" by Allan Kuchinsky et al., pp. 1–8. Paper presented at the CHI Conference in 1999.
U.S. Ser. No. 09/549,356 filed Apr. 14, 2000 by Prabhu et al.
Digital Still Camera Image File Format Standard, Version 2.1, Jul. 1998, Japan Electronic Industry Development Association.
PC Card Standard Release 2.0, Personal Computer Memory Card Association, Sep. 1991.
CompactFlash Specification Revision 1.4, CompactFlash Association, Jul. 1999.

* cited by examiner

*Primary Examiner*—Safet Metahic
*Assistant Examiner*—Sana Al-Hashemi
(74) *Attorney, Agent, or Firm*—Stephen H. Shaw

(57) ABSTRACT

A method for adding personal image metadata to a collection of images, including the steps of: configuring, in response to user's answers to predetermined queries prior to image capture, a database of pre-assigned metadata labels useful for classifying future images, wherein at least one pre-assigned metadata label has a label identifier relating to emotional or aesthetic judgment of a user of the database; storing the database of pre-assigned metadata labels in a digital memory; displaying the collection of images that have been captured by the user, and a menu for selecting the pre-assigned metadata labels; selectively assigning at least one pre-assigned metadata label to at least one digital image in response to user's input; and storing the label identifier of the selected metadata label in association with the selected digital image.

14 Claims, 7 Drawing Sheets

METHOD FOR ADDING PERSONALIZED METADATA TO A COLLECTION OF DIGITAL IMAGES

FIELD OF THE INVENTION

The invention relates generally to the field of photography, and in particular to collecting and categorizing images. More specifically, the invention relates to a personal database of metadata labels constructed prior to image capture.

BACKGROUND OF THE INVENTION

Image metadata is well-known, and is useful in retrieving desired images from a large collection of images. The Kodak DC265. camera formulates many metadata items, such as the date/time, camera lens setting, scene light level, etc. when the picture is taken, and stores this metadata within the Exif/JPEG digital image file. Unfortunately, this metadata cannot identify the subject of the photo, or whether this particular photo is one of the user's "favorite" photos. It is this latter type of information that is most useful in quickly and easily retrieving desired images from a large collection of pictures.

Many software applications allow the user to manually type in text, such as a "picture title" or "picture description", and store this text within the image file. This could be used to add a description including the people, events, or type of photo. The text strings from all images in the database could later be searched to retrieve images having the names, events, etc. of interest. Unfortunately, this is an extremely tedious method of adding metadata. In addition, since the user may type in different text to describe the same item (e.g. Matt, Matthew, or X-mas, Christmas) the database may not contain consistent names for the same picture categories. Some particular software applications, such as Image Expert 2000 developed by Sierra Imaging Inc., allow the user to add keywords to captured images. The keywords are categorized as "location", "occasion", "photographer", and "subject". While viewing a group of thumbnail images, a user can create keywords in these categories and assign the keywords to one or more captured images by selecting the thumbnails and keywords. The keywords from all images in the database can later be searched to retrieve images that were assigned to those particular keywords.

Unfortunately, these conventional software applications make it difficult for an untrained consumer to categorize their images in a way that enables them to later locate their favorite images of a selected subject. What is needed is a simple, fast method for the user to add emotional or aesthetic based type metadata to a collection of images, and to use this emotional or aesthetic based metadata to retrieve images of interest.

SUMMARY OF THE INVENTION

The present invention is directed to overcoming one or more of the problems set forth above. Briefly summarized, according to one aspect of the present invention there is a method for adding personal image metadata to a collection of images including the steps of: configuring, in response to user's answers to predetermined queries prior to image capture, a database of preassigned metadata labels useful for classifying future images, wherein at least one pre-assigned metadata label has a label identifier relating to emotional or aesthetic judgment of a user of the database; storing the database of pre-assigned metadata labels in a digital memory; displaying the collection of images that have been captured by the user, and a menu for selecting the pre-assigned metadata labels; selectively assigning at least one pre-assigned metadata label to at least one digital image in response to user's input; and storing the label identifier of the selected metadata label in association with the selected digital image.

The present invention has the advantage of allowing a user to preemptively categorize photos that are particularly noteworthy to the user. The application can display a menu of metadata labels, including labels such as "favorite photos", "funny photos", etc. The metadata labels, or alternatively metadata label identifier codes, are then stored within the image files and/or in a database separate from the image files, but referencing the appropriate images. At a later time, when the database contains hundreds or thousands of images, several metadata labels can be selected together to easily retrieve images. For example, by selecting the categories "Matthew", "Matthew's Birthday", and "favorite photos", the user can get a thumbnail display or slide-show of the "best" photos of Matthew taken on his birthday every year, rather than searching through a collection of hundreds or thousands of captured digital image files.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
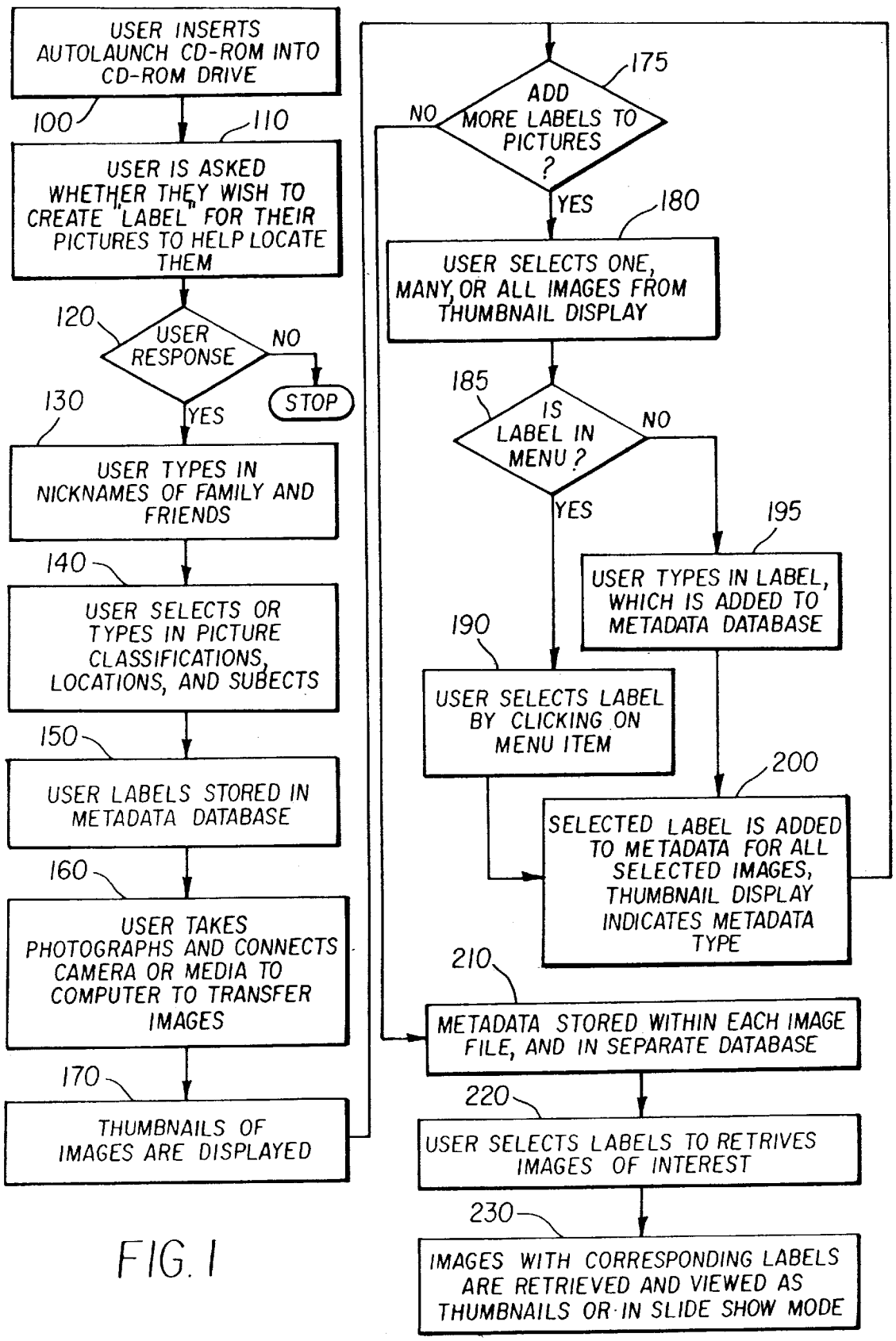
FIG. 1 is an example flow diagram of the method of this invention.

Referring to FIG. 1 a flow diagram of an exemplary embodiment of the present invention for adding personalized metadata to a collection of images is shown. Operation block 100 discloses a user inserting an auto-launch CD-ROM into a CD-ROM drive of a computer in order to install software that implements the method of the present invention. Operation 110 discloses prompting a user to create "labels" for their pictures (i.e., images), prior to capturing any images, for the purpose of locating (i.e., retrieving) the pictures at a later time. An inquiry operation 120 asks the user to respond affirmatively or negatively. Should the user respond negatively, all operations cease. In contrast, should the user respond affirmatively, she would be prompted to enter nicknames of her family and friends by operation 130. As will be described later, the user entries are prompted by questions including "please enter first names of family members and pets" and "please enter nicknames of friends you often photograph". Subsequently, the user is prompted to either select or enter picture classifications, locations, and subjects according to operation 140. As will be described later, the user entries concerning classifications are prompted by questions concerning the types of situations and occasions that they generally photograph.

Operation 150 causes user labels to be stored in a metadata database. This completes the process of developing the database of pre-assigned metadata labels personalized for the particular user. Some time later (e.g., immediately thereafter, or several hours later, or several days later), a user can capture one or several images and transfer the captured images to the computer in operation 160. Upon transfer of the images in operation 160, operation 170 causes thumbnail images to be displayed.

Operation 175 queries the user whether more labels should be added to the images. Simultaneously, operation 200 adds a selected label to metadata for all selected images. Operation 180 receives an affirmative response from the query of operation 175. The user selects one, many, or all of the images from the thumbnail display in operation 180. A final query operation 185 asks whether the label is part of a pull down menu. An affirmative response is an input for operation 190, wherein the user selects a label by clicking on a menu item. Next, operation 200 adds the selected label to metadata for all selected images. A negative response the final query operation 185 causes operation 195 to prompt the user to enter in a label, which is then added to the metadata database.

A negative response to query operation 175 causes operation 210 to store metadata within each image file and in a separate database. Some time later (e.g., immediately thereafter, or many days later, or many years later), operation 220 prompts the user to select labels in order to retrieve images of interest. In the final operation 230, images with corresponding labels are retrieved and viewed as thumbnails (so that the corresponding full resolution images can be selectively printed, transmitted, etc.) or may be viewed as a slide show.

Figure 2:
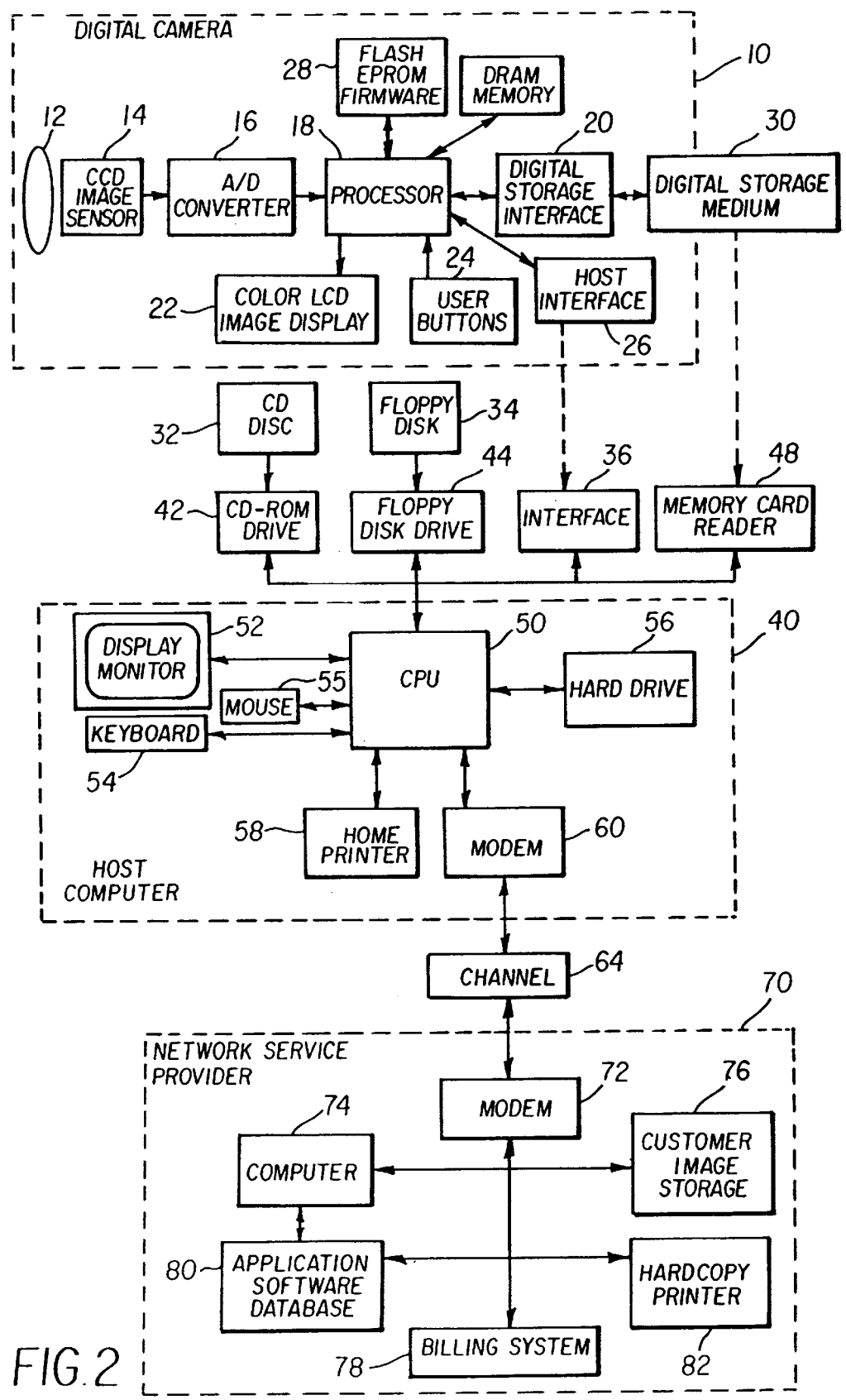
FIG. 2 shows a block diagram of a system that implements this invention.

FIG. 2 is a block diagram of a digital imaging system useful in practicing the method of the present invention, which enables users to easily customize the interface and features of their digital camera prior to taking pictures. The digital imaging system includes a digital camera 10 which is supplied along with metadata categorization software provided on a compact disc, CD-ROM 32, a floppy disk 34, or other digital media. The digital imaging system also includes a host computer 40, such as a Dell Dimension XPS M200, and a Network Service Provider 70. In accordance with one preferred embodiment of the present invention, metadata categorization software is executed external to the digital camera 10, and is executed on the host computer 40. However, the metadata categorization software can alternatively be executed by an Internet appliance, set-top box, or other external device, or can be executed internal to the digital camera 10, provided that the digital camera has an appropriate user interface for displaying and responding to questions. The metadata categorization software can be provided along with the camera customization software described in commonly-assigned U.S. Ser. No. 09/549,356 filed Apr. 14, 2000 by Prabhu et al.

The digital camera 10 produces digital images that are stored on a removable memory card 30 or other digital storage device. The digital camera 10 has a zoom lens 12 that is controlled by a zoom switch (not shown) having telephoto (T) and wide angle (W) positions, and having zoom and focus motor drives (not shown), and an adjustable aperture and shutter (not shown) for focusing light from a scene onto an image sensor 14. The image sensor 14 can be, for example, a single-chip, colored, charge-coupled device (CCD), using the well-known Bayer color filter pattern. When the user depresses a shutter button (not shown), the analog output signal from the image sensor 14 is converted to digital data by an analog-to-digital (AID) converter 16. The digital data is processed by a processor 18 that is controlled by firmware stored in a reprogrammable memory, such as a Flash EPROM 28.

The processed digital image file is provided to a digital storage interface 20 which stores the digital image file on the removable memory card 30, or on another type of digital memory device, such as a floppy disk or magnetic hard drive, or smart media. The removable memory card 30, which is well-known to those skilled in the art, can include, for example, a memory card adapted to the PCMCIA card interface standard, as described in the *PC Card Standard, Release* 2.0, published by the Personal Computer Memory Card International Association, Sunnyvale, Calif. September 1991. The removable memory card 30 can also be adapted to the Compact Flash interface standard, such as described in the *CompactFlash Specification Version* 1.4, published by the CompactFlash Association, Palo Alto, Calif. July 1999, or to other memory devices such as the well-known SSFDC (Solid State Floppy Disc Card) or Memory Stick formats.

The processor 18 performs color interpolation followed by color and tone correction, in order to produce rendered sRGB image data. The processor 18 can include internal buffer memory to store a portion of the image, or to store one or more entire images. Alternatively, the processor 18 can use a separate external memory (not shown), such as DRAM memory. The rendered sRGB image data is then JPEG compressed and stored as a JPEG image file on the removable memory card 30. The processor 18 also provides a lower resolution or "thumbnail" size image data to a color image display 22, such as a color liquid crystal display (LCD), which displays the captured image for the user to review. The low-resolution image can be created as described in commonly-assigned U.S. Pat. No. 5,164,831 issued Nov. 17, 1992 to Kuchta et al. entitled *Electronic Still Camera Providing Multi-Format Storage Of Full And Reduced Resolution Images*. Several camera user buttons 24 are used to control the digital camera 10. The camera user buttons 24, together with text and icons displayed on the image display 22 (not shown), form the camera graphical user interface (GUI). This GUI is controlled by the user interface portion of the firmware stored in the Flash EPROM 28.

The digital camera 10 determines various metadata items, such as the date/time the picture was taken from the real-time clock (not shown) provided by the processor 18, the camera lens settings, scene light level, etc. These metadata items are stored within a so-called "Exif" image file as defined in "Digital Still Camera Image File Format (Exif)" version 2.1, June 1998 by the Japan Electronics Industries Development Association (JEIDA), Tokyo, Japan. This format includes an Exif application segment that stores particular image metadata, for example the date and time the picture was captured, the lens f/number and other camera settings. It can also include user-selected custom metadata labels, as will be described later.

After a series of images has been taken by the digital camera 10 and stored on the removable memory card 30, the removable memory card 30 can be inserted into a memory card reader 48 attached to or incorporated within the host computer 40. Alternatively, an interface cable 36 can be used to connect between a host interface 26 in the digital camera 10 and a camera interface 46 which may be external or internal to the host computer 40. The interface cable 36 may conform to, for example, the well-known universal serial bus (USB) interface specification.

The captured images from the digital camera 10 can be downloaded to the host computer 40 and stored on a hard drive 56 under the control of a central processing unit (CPU) 50. The CPU 50 is coupled to a display monitor 52, which is used to view the images, and a keyboard 54. A mouse 55 permits the user to readily communicate with the CPU 50. The CPU 50 communicates with a CD Rom drive 42 in order to read the information on the CD disc 32. The CPU 50 also communicates with the floppy disk drive 44 in order to read the information on the floppy disk 34. The CPU 50 communicates with a local printer 58, such as an Epson Stylus Photo 700 printer, which produces hard copy prints of the images that were captured by the digital camera 10.

The digital camera 10 that is supplied to a user includes firmware that provides normal camera features and remains stored in the Flash EPROM 28. In an alternative embodiment of the present invention, the user can customize the firmware stored in Flash EPROM 28 of the digital camera 10 using the metadata categorization software provided with the digital camera 10, so that the metadata labels entered or selected by the user in blocks 130 and 140 of FIG. 1 are stored in Flash EPROM 28. The color LCD image display 22 and user buttons 24 are then used to assign metadata labels to images, substituting for blocks 175 through 210 of FIG. 1, as the images are captured or reviewed using the digital camera 10. The CPU 50 uses the metadata categorization software in accordance with the present invention to provide custom metadata labels within the firmware code that is downloaded under the control of processor 18 of the digital camera 10 via the removable memory card 30, and stored in the Flash EPROM 28, as described in commonly-assigned U.S. Pat. No. 5,477,264 issued Dec. 19, 1995 to Sarbadhikari et al entitled *Electronic Imaging System Using a Removable Software-Enhanced Storage Device*, or via the interface cable 36 as described in commonly-assigned U.S. Pat. No. 5,734,425 issued Mar. 31, 1998 to Takizawa et al. entitled *Electronic Still Camera With Replaceable Digital Processing Program*.

The metadata categorization software provided on the CD-ROM disc 32 or the floppy disk 34 can also include digital image application software, such as the Picture Easy™ version 3.1 software developed by the Eastman Kodak Company. Alternatively, instead of being provided on a CD-ROM 32 or floppy disk 34, the metadata categorization software could be downloaded from the Network Service Provider 70 via a modem 60. The modem 60 communicates via a channel 64 with another modem 72 at the Network Service Provider 70, which is connected to a computer 74, and a customer image storage device or system 76. A billing system 78 can charge the user (e.g., via a credit card) for downloading the metadata categorization software. The computer 74 operates an application software database 80 that can also provide input to one or more hardcopy printers 82 for subsequent printing of images captured by the digital camera 10.

As shown in block 100 of FIG. 1, the user begins by installing the program on her computer. The program may be provided on a CD disc 32 which may be a Photo CD also having digitized images (so that the digital camera 10 is not needed), or can alternatively be included as part of application software provided with the digital camera 10. As part of this installation process, the user is prompted to answer a number of questions (blocks 130 and 140 of FIG. 1) that produce a personalized database of metadata "labels". At least some of the database of metadata labels is derived from the user's emotional judgment about the content of the images that she usually captures. The present invention allows a user to develop emotional or aesthetic based metadata that is useful in categorizing several of the user's captured images according to the user's own emotional or aesthetic judgment regarding the captured images.

The emotional or aesthetic based metadata is derived from a user answering queries about her family, friends, and her aesthetic judgment of the typical images that she captures. Consequently, the user is able to preemptively categorize "how much they like a picture" by using emotional or aesthetic based metadata labels such as "favorite photos", "best photos", "cute photos", "important moments", or "funny photos." These metadata labels are then stored within the captured image files and/or in a database that may be separate from the image files, but still references the appropriate categorized images. Labels assigned to each digital image file may be stored as ASCII text strings or as other types of metadata label identifiers, such as digital code values assigned to a particular metadata label. For example, a user's "best" pictures may be stored with the ASCII text "BEST", for "user image value", or may be stored with the digital value "10" (using a 10 point scale where 1 is lowest and 10 is highest) as the metadata label identifier in the "user image value" field. After describing how the answers will be used, the following types of personal queries may be asked:

Type the nicknames of immediate family members

Type the nicknames of friends you often photograph

Are these good ways to classify your pictures? (select, deselect, or add)

Best photos, funny photos, cute photos, important moments

Where do you often take pictures (select, deselect, or add)

Our house, our yard, (friend's name's house), zoo,_park, etc.

What type of pictures do you often take (select, deselect, or add)

Portraits, landscapes, flower & plants, sports

In block 150, the user's responses to these questions are used to configure and store a database of pre-assigned metadata labels for the user in a digital memory, normally hard drive 56 of computer 40.

In block 160, the user then proceeds to use the metadata categorization software to display images either stored in or downloaded from the digital camera 10, or provided from a Picture CD 32, or another image source. For example, in block 130 to 140 of FIG. 1, the user may develop metadata labels that relates to family members, that family member's birthday party, as well as emotional metadata labels, for example images that the user 'feels' are her favorite photos. For an explicit example, a user selects categories labeled "Matt", "Matt's Birthday", and "favorite photos". Adding labels to the appropriate images as part of blocks 175 through 210 of FIG. 1 will enable the user to later (in blocks 220 through 230) quickly and easily access a thumbnail display or slideshow of the "best" photos featuring Matt taken on his birthday every year that pictures were taken, rather than searching through a collection of hundreds or thousands of captured digital image files taken over many years.

Figure 3:
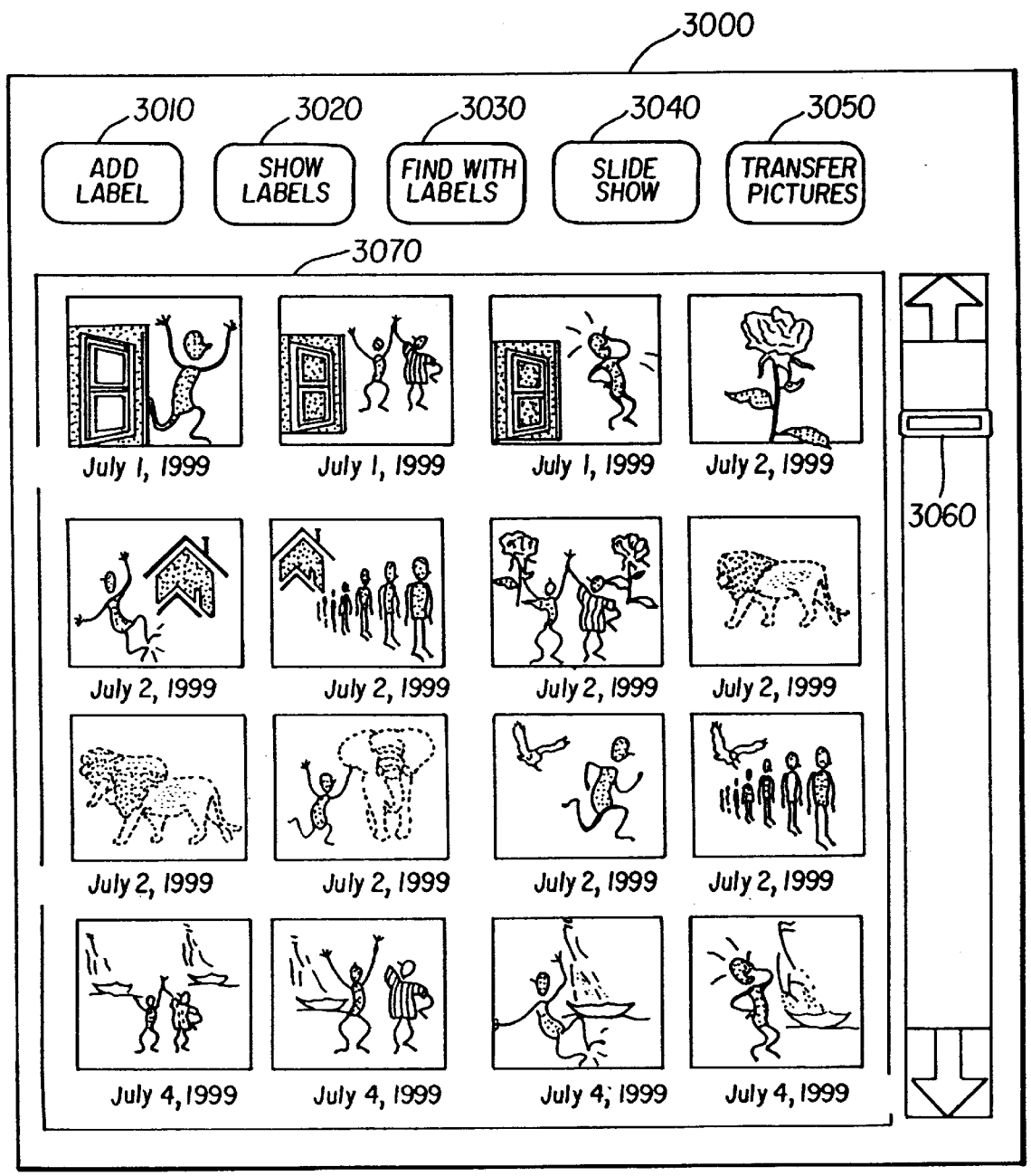
FIG. 3 shows an example of a main user interface screen.

As part of block 160, the images from the camera (or full size or thumbnail size images from the PhotoCD) are transferred to the computer hard drive 56. In block 170, the CPU 50, running the metadata categorization software displays thumbnail size images of each new downloaded picture on the computer monitor, as depicted in FIG. 3, along with a message such as "Label your photos now, so you can find them later". The user selects one, several, or all of the thumbnail images by clicking on the images. The user then selects, from a pull-down menu, a metadata category (e.g., "People—who's in the picture", "Subject—who's in this picture", "Type—What type of picture is this?" Then, for the selected category, they select one or more metadata items using blocks 175 through 200 of FIG. 1. For example, if they select "Subject—who's in this picture, the application may display a menu listing "Ken, Susan, Matthew, JoAnn, etc." and allow them to click on one or more names. If necessary, they can type in new names (block 195 of FIG. 1), which are added to future display lists. When the user selects "Type— what type of picture is this", the application displays a menu including a number of emotional or aesthetic categories such as "best photos", "funny photos", etc."

Example display and pull-down menu embodiments for blocks 175 through 200 of FIG. 1 are shown in FIGS. 3–6. Referring to FIG. 3, a "Main User Interface Screen" 3000 includes the following toolbar buttons: an "Add Label" 3010, a "Show labels" 3020, a "Find with Labels" 3030, a "Slide Show" 3040, and a "Transfer Pictures" 3050. The main user interface screen 3000 has a slider or scrollbar 3060 for scrolling up and down through a group of thumbnail images. Many thumbnail images 3070 (e.g. 16 thumbnail images) may be displayed for the user to view and choose.

The interface screen shown in FIG. 3 provides an efficient way for the user to enter metadata for images, a "group" of thumbnails at a time. A typical digital memory card 30 can contain, for example, 24 pictures taken over 3 "picture taking sessions". For example, over the course of a weekend, the group of images on the digital memory card 30 may include 12 shots taken at Matthew's birthday party at home, 8 shots taken during a visit to the zoo, and 4 taken during a stop at JoAnn's house. The thumbnail images 3070 shown in FIG. 3 are 16 images from this set, corresponding to the position of scroll bar 3060 within the set of images. The thumbnail images 3070 are provided using the thumbnail image data stored within the Exif image file. The date each image was taken is also read from the Exif image file metadata and displayed beneath each image. In order to label images, the user selects the "add label" icon 3010.

Figure 4:
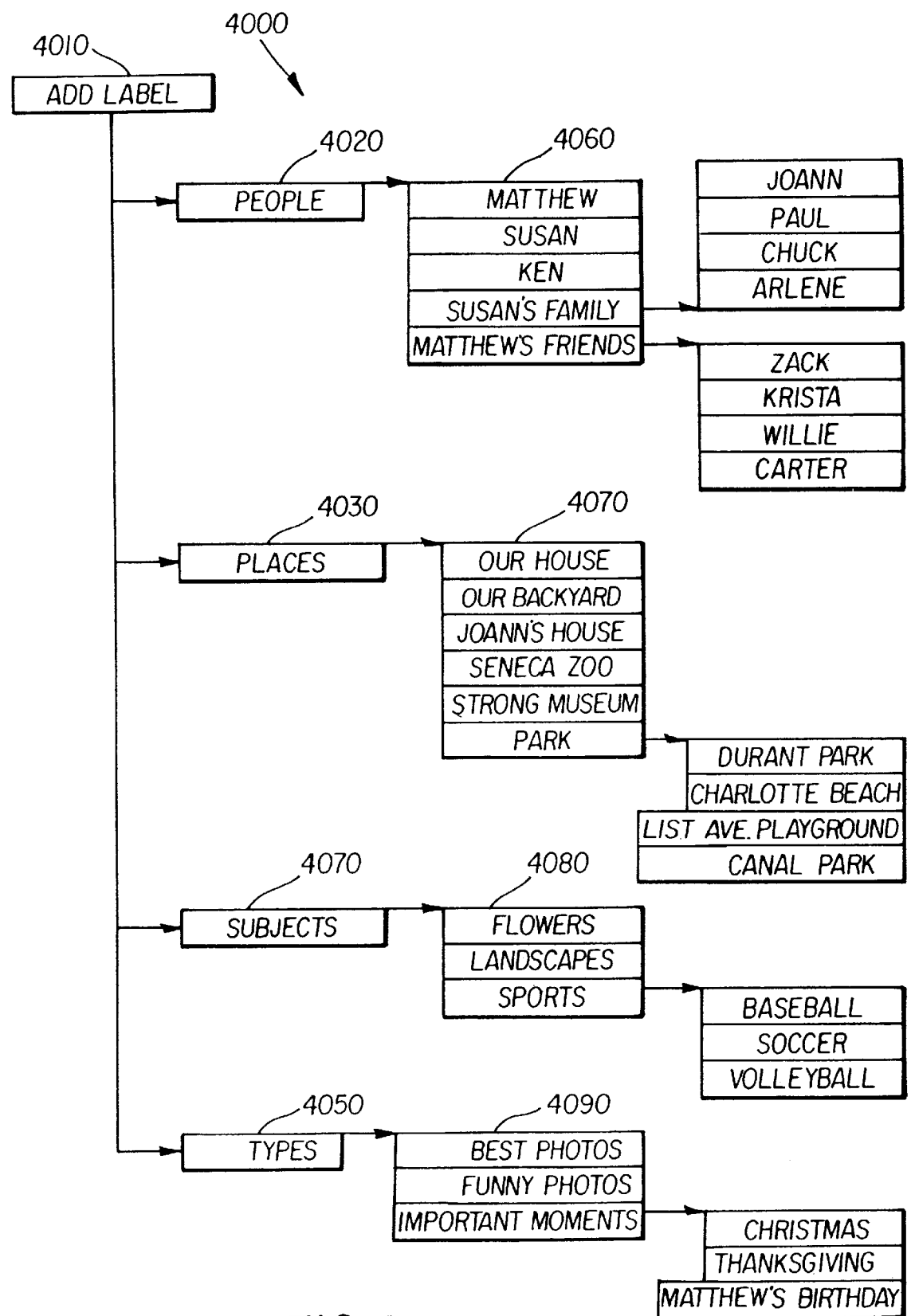
FIG. 4 shows an example menu for selecting labels.

Referring to FIG. 4, a screen entitled, "Menu for Selecting Labels" 4000 lists an example of pre-assigned metadata labels configured in blocks 130 to 150 of FIG. 1, which can now be selected by the user in block 190 of FIG. 1. The list includes the following menu selections: an "Add Label" 4010, a "People" 4020, a "Places" 4030, a "Subjects" 4040, a "Types" 4050. At the next level, the selections correspond with the user's input to the previous selections. For example selection 4060 corresponds with the user's input to menu selection 4020 (e.g. the list of family members and friends that are often photographed). Selection 4070 corresponds to the user input for menu selection 4030. Selection 4080 corresponds to the user input for menu selection 4040. Selection 4090 corresponds to the user input for menu selection 4050. One of ordinary skill can envision further levels as well.

Figure 5:
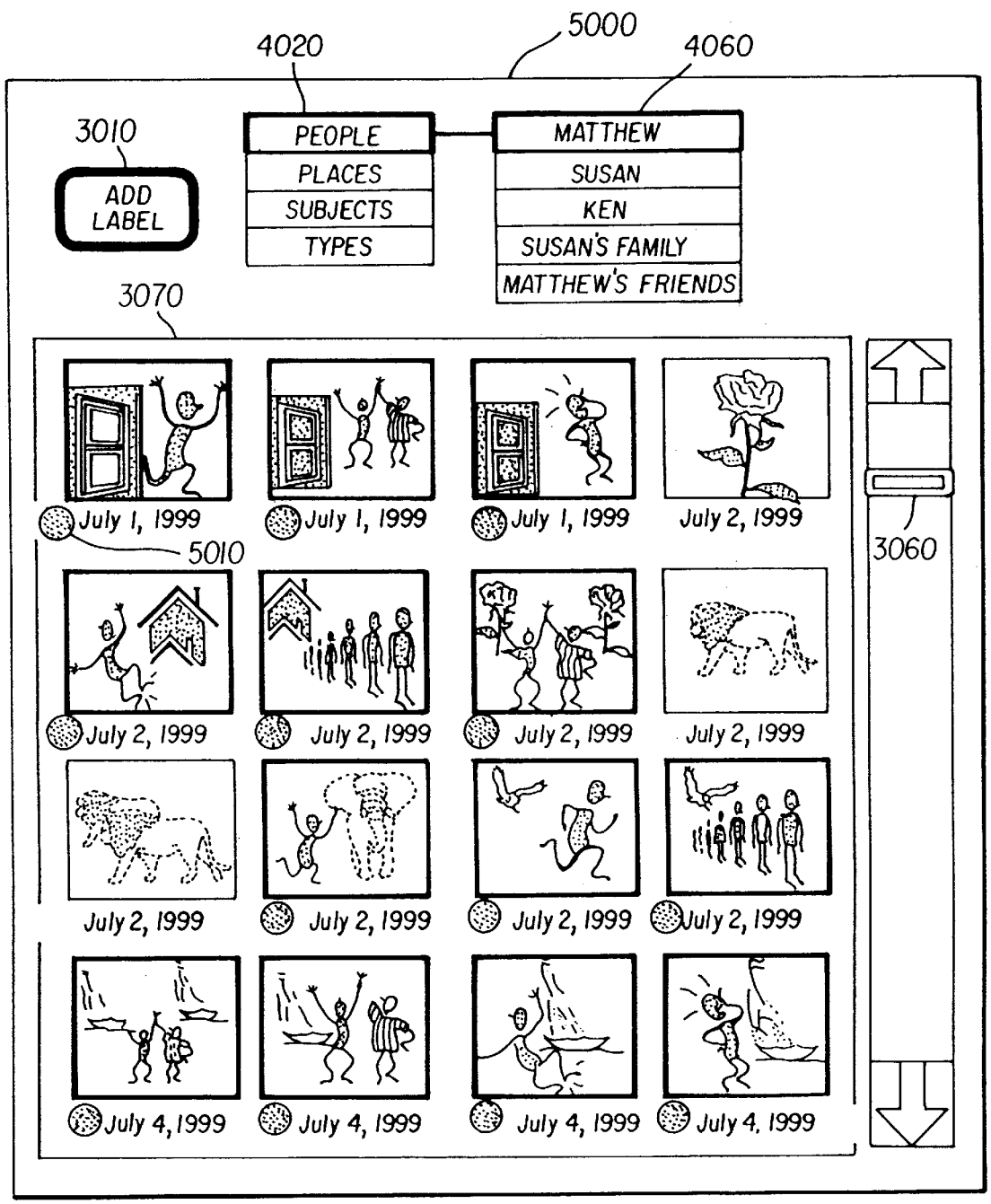
FIG. 5 shows an example of the main user interface screen as labels are selected.

Referring to FIG. 5, a display screen 5000 showing how the "main user interface screen labels are selected" is disclosed. A user selects "Add Label" 3010, and uses the pull down menu to select "People" 4020, whereby a second pull down menu with the user's input 4060 is shown. The display includes a scroll bar 3060 and several thumbnail images 3070 as well as icons or text 5010 that indicate which of the thumbnail images 3070 have associated metadata labels.

Figure 6:
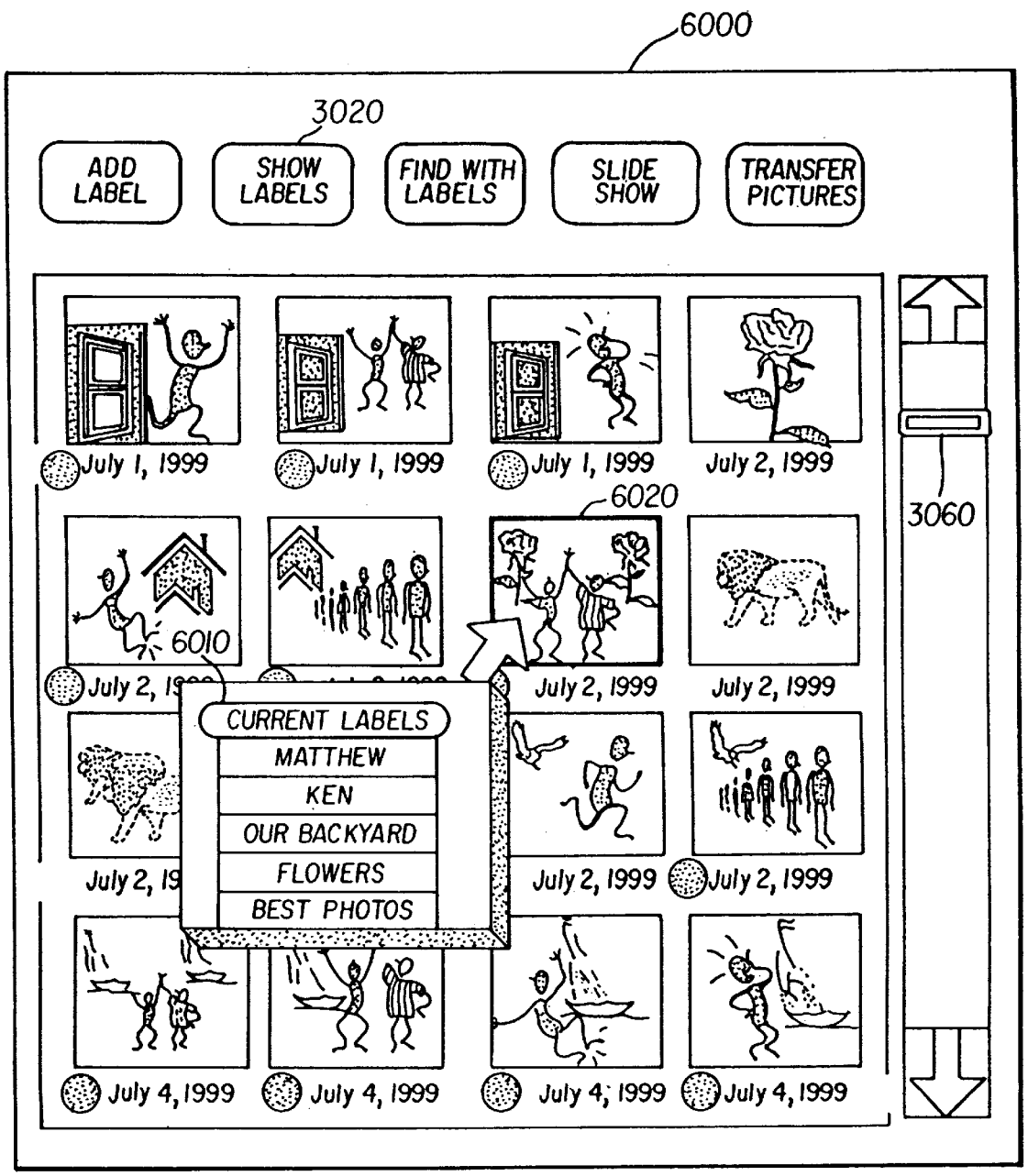
FIG. 6 shows a user interface screen displaying a selected picture with its corresponding metadata labels.

FIG. 6 displays a screen 6000 that depicts a selected picture 6020 with its associated metadata labels 6010. The current labels 6010 correspond to the labels selected during steps 175 through 200 of FIG. 1. The selected picture 6020 includes the labels 6010 "Matthew" (people), "Ken" (people), "Our backyard" (place), "Flowers" (subjects) and "Best photos" (type).

In block 180, the user selects one or more thumbnail images using the thumbnail images 3070. For example, the user can quickly highlight the first 12 images, and then select (in block 190) Event→Matthew's birthday to label all of these images using the list shown in FIG. 4, and proceed to highlight and label the other groups if they wish (repeating blocks 175 through 200 of FIG. 1). As another example, also shown specifically in FIG. 5, in block 180 of FIG. 1 the user can highlight all the images on the roll with one click, deselect those few that do not include Matthew, and then select People→Matthew in block 190 to further label the appropriate images. As another example, in block 180 the user can highlight the one or two of the pictures they judge to be their very best images of the group, and select Type→Best Photos in block 190. If an appropriate label does not exist, the user can create a new label in block 195, which is stored in the metadata label database for future use.

As labels are added to each image, graphics 6010 (or text) coded to indicate the category of labels provided for the image, are positioned in the corner of the corresponding thumbnail image display, as shown in FIG. 6. When the "show labels" button 3020 is selected by the user, the labels are displayed adjacent to the selected image, so that it is apparent what labels have been applied to a particular image, as shown in FIG. 6. In this mode, the user can also add additional labels or change previous-applied labels for that particular image.

Figure 7:
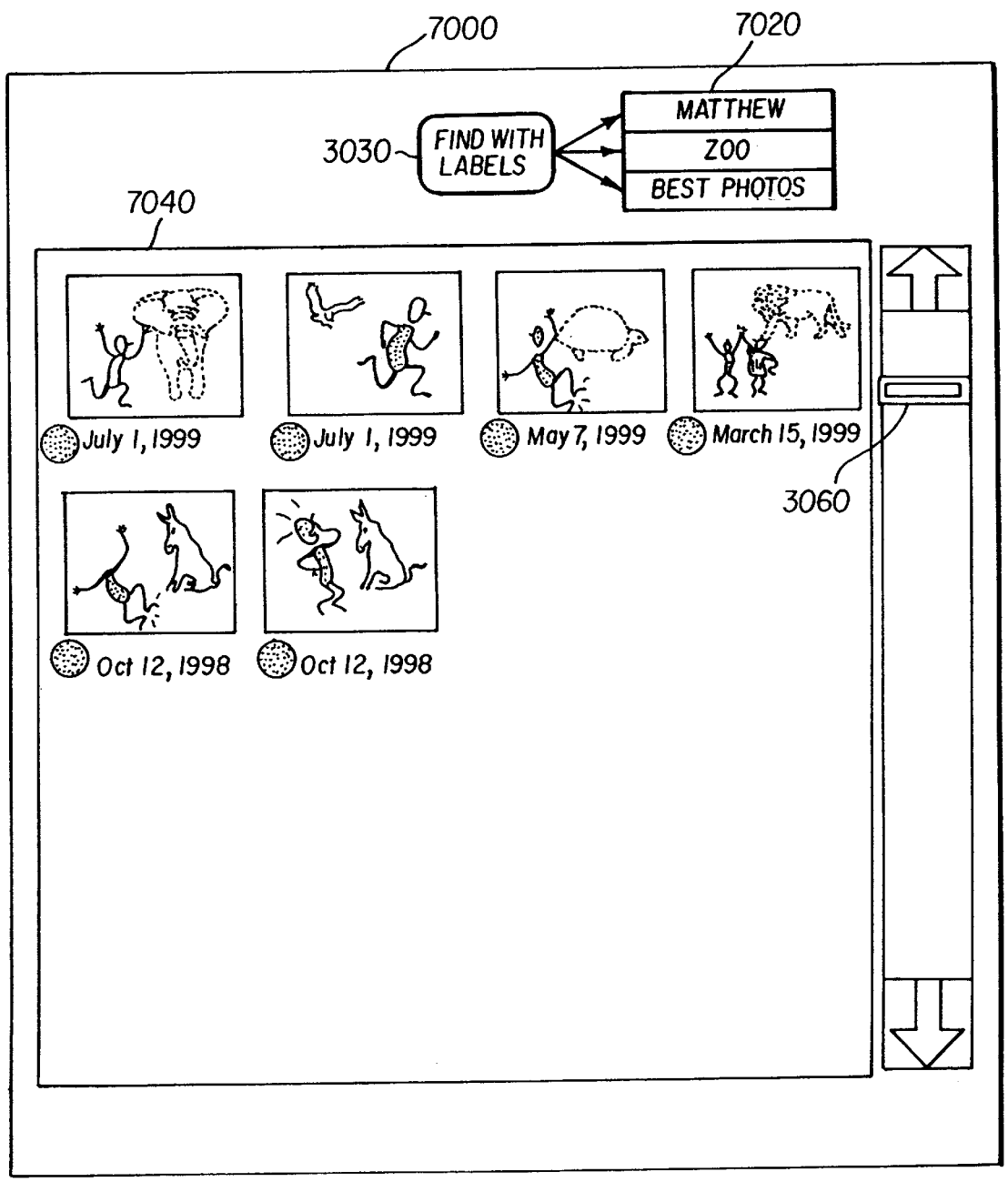
FIG. 7 shows the user interface screen displaying an image retrieved using selected labels.

In block 210, the metadata text labels or other metadata label identifiers are then stored within the image files and/or in a database separate from the image files. At a later time, when the database contains hundreds or thousands of images, the metadata can be used to easily retrieve images. FIG. 7 discloses a "Find with Labels" feature 7000 that allows a user to locate images using the pre-assigned metadata labels configured in blocks 130 through 150 of FIG. 1 and assigned to particular images in blocks 175 through 210 of FIG. 1. Toolbar button "Find with labels" 3030 is selected. The user then selects, from he menu depicted in FIG. 4, labels of interest, for example the labels "Matthew", "Zoo", and "Best photos" 7020. A scroll bar 3060 allows a user to scroll the images 7040 found by the label search. In the example of FIG. 7, by selecting the categories "Matthew", "Zoo", and "Best photos", the user can get a thumbnail display or slideshow of the best photos featuring Matt taken on his birthday over the course of several years, rather than searching through a collection of hundreds or thousands of digital image files stored on hard drive 56.

In an alternative embodiment, blocks 170 through 210 of FIG. 1 are implemented in the digital camera 10 of FIG. 2. In another alternative embodiment, the user identifies only certain types of images, such as favorite images, important events, or funny images, when the images are captured on digital camera 10, by selecting the appropriate labels using user buttons 24 while reviewing captured image thumbnails on the color LCD image display 22. The metadata labels associated with these emotional or aesthetic judgements are then stored within the Exif image files. Additional metadata labels can optionally be added when these images are transferred from the digital camera 10 to the computer 40, as described earlier in relation to blocks 170 through 210 of FIG. 1.

Computer program products, such as readable storage medium, can be used to store the customization software, and also the desired firmware components in accordance with the present invention. The readable storage medium can be a magnetic storage media, such as a magnetic disk (such as a floppy disk) or magnetic tape; optical storage media, such as an optical disk, an optical tape, or a machine readable bar code; solid state electronic storage devices, such as a random access memory (RAM) or a read only memory (ROM); or any other physical device or medium employed to store computer programs.

The invention has been described with reference to a preferred embodiment. However, it will be appreciated that variations and modifications can be effected by a person of ordinary skill in the art without departing from the scope of the invention.

PARTS LIST

10 digital camera
12 lens
14 CCD image sensor
16 A/D converter
18 processor
20 digital storage interface
22 color LCD image display
24 user buttons
26 host interface
28 flash EPROM
30 memory card
32 CD-R disc
34 floppy disk
36 interface
40 host computer
42 CD-ROM drive
44 floppy disk drive
46 camera interface
48 memory card reader
50 CPU
52 display monitor
54 keyboard
55 mouse
56 hard drive
58 local printer
60 modem
64 channel
70 network service provider
72 modem
74 computer
76 customer image storage
78 billing system
80 application software database
82 printer
100 autolaunch operation
110 label query operation
120 user response
130 nickname operation
140 picture classification operation
150 label storage operation
160 image capture operation
170 image display operation
175 additional label query
180 image selection operation
185 menu query
190 label selection operation
195 metadata database input operation
200 label and metadata match operation
210 image-associated metadata storage operation
220 label selection operation
230 image viewing operation
3000 Main User Interface Screen
3010 Add label toolbar button
3020 Show labels toolbar button
3030 Find with labels toolbar button
3040 slide show toolbar button
3050 transfer pictures toolbar button
3060 scroll bar toolbar button
3070 thumbnail images toolbar button
4000 Menu for selecting labels
4010 add label toolbar button
4020 people selection
4030 places selection
4040 subject selection
4050 types selection
4060 user input associated people selection
4070 user input associated places selection
4080 user input associated subjects selection
4090 user input associated types selection
5000 screen for how "Main User Interface labels are selected"
5010 metadata label icon
6000 screen for "Show Picture Labels"
6010 current picture labels displayed
6020 associated thumbnail image
7000 screen for "Find with Labels"
7020 user selected labels
7040 label search images

What is claimed is:

1. A method for adding personal image metadata to a collection of images comprising the steps of:

(a) configuring, in response to user's answers to predetermined queries prior to image capture, a database of preassigned metadata labels useful for classifying future images, wherein at least one pre-assigned metadata label has a label identifier relating to emotional or aesthetic judgment of a user of the database;

(b) storing the database of pre-assigned metadata labels in a digital memory;

(c) displaying the collection of images that have been captured by the user, and a menu for selecting the pre-assigned metadata labels;

(d) selectively assigning at least one pre-assigned metadata label to at least one digital image in response to user's input; and (e) storing the label identifier of the selected metadata label in association with the selected digital image.

2. The method claimed in claim 1, further comprising the step of (f) selecting at least one pre-assigned metadata label, in response to the user inputs;

(g) searching the collection of digital images to retrieve at least one image having the selected pre-assigned metadata label.

3. The method claimed in claim 1, wherein the metadata label includes one type of label indicating that the image is a member of a category selected by the user.

4. The method claimed in claim 1, wherein the method is practiced by a digital camera.

5. The method claimed in claim 1, wherein the predetermined queries include at least one of:

a) "Where do you often take pictures?"
b) "What type of pictures do you often take?"
c) "What are your nicknames for immediate family members?"
d) "What are your nicknames of friends that you photograph?"
e) "Are these good ways to classify your pictures?", and
f) "My best photos, funny photos, cute photos, important moments".

6. An image categorization system, comprising:
   a) a memory device that digitally stores a collection of captured images;
   b) user controlled means for inputting, prior to image capture, personal capturing information, including a plurality of metadata items;
   c) means for viewing the collection of captured images on a display device; and
   d) means for labeling the collection of captured images with the personal capturing information, wherein the means for labeling includes user selection means for selecting at least one captured image and at least one metadata item from the plurality of metadata items included in the personal capturing information.

7. The image categorization system claimed in claim 6, further comprising:
   a) means for creating additional personal capturing information; and
   b) means for editing existing personal capturing information.

8. The image categorization system claimed in claim 7, further comprising:
   a) a memory device that digitally stores the labeled collection of captured images; and
   b) means for electronically retrieving the labeled collection of captured images.

9. A computer software product comprising a computer readable storage medium having a computer program which when loaded into a computer causes the computer to perform the following steps:
   a) displaying at least one captured image for categorization; and
   b) providing at least one pre-assigned aesthetic category which when selected by the user is associated with the captured image.

10. The computer software product according to claim 9, wherein the aesthetic category comprises at least one of:
    a) Favorite image;
    b) Humorous image;
    c) Artistic image;
    d) Emotional image;
    e) Cute image; and
    f) Important moment image.

11. A computer software product comprising a computer readable storage medium having a computer program which when loaded into a computer causes the computer to perform the steps according to claim 1.

12. A computer software product comprising a computer readable storage medium having a computer program which when loaded into a computer causes the computer to perform the steps according to claim 2.

13. A computer software product comprising a computer readable storage medium having a computer program which when loaded into a computer causes the computer to perform the steps according to claim 3.

14. A computer software product comprising a computer readable storage medium having a computer program which when loaded into a computer causes the computer to perform the steps according to claim 5.

* * * * *